United States Patent
Liu et al.

(10) Patent No.: US 7,062,176 B2
(45) Date of Patent: Jun. 13, 2006

(54) NONLINEAR PHASE-SHIFT COMPENSATION METHOD AND APPARATUS

(75) Inventors: Xiang Liu, Marlboro, NJ (US); Colin J McKinstrie, Manalapan, NJ (US); Linn Frederick Mollenauer, Colts Neck, NJ (US); Richart Elliott Slusher, Lebanon, NJ (US); Xing Wei, New Providence, NJ (US); Chunhui Xu, Ithaca, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 327 days.

(21) Appl. No.: 10/331,217

(22) Filed: Dec. 30, 2002

(65) Prior Publication Data

US 2004/0125435 A1 Jul. 1, 2004

(51) Int. Cl.
- H04B 10/02 (2006.01)
- H04B 10/18 (2006.01)
- G02B 5/00 (2006.01)
- G02F 1/03 (2006.01)
- G02F 1/355 (2006.01)
- H04B 10/06 (2006.01)
- G02F 1/35 (2006.01)
- G02F 1/377 (2006.01)

(52) U.S. Cl. .................... 398/159; 398/208; 385/1; 385/122

(58) Field of Classification Search ............ None
See application file for complete search history.

(56) References Cited

U.S. PATENT DOCUMENTS

| 6,591,047 B1 * | 7/2003 | Malomed et al. ........... 385/122 |
| 6,816,656 B1 * | 11/2004 | Gutin et al. ................ 385/122 |
| 6,915,084 B1 * | 7/2005 | Ho et al. .................... 398/208 |
| 2002/0141041 A1 * | 10/2002 | Payne et al. ................ 359/337 |

OTHER PUBLICATIONS

Alam, S.-U. et al. "Cascaded nonlinearity: a simple technique to compensate Kerr effect in optical amplifiers." OFC/IOOC '99. Technical Digest, vol. 3. Feb. 21-26, 1999: 5-7.*

Gabitov, I.R. "Nonlinearity management in a dispersion-managed system." Optics Letters, vol. 27, No. 2. Jan. 15, 2002: 113-115.*

Liu, X. et al. "Improving transmission performance in differential phase-shift-keyed systems by use of lumped nonlinear phase-shift compensation." Optics Letters, vol. 27, No. 18. Sep. 15, 2002: 1616-1618.*

Xu, C. and X. Liu. "Postnonlinearity compensation with data-driven phase modulators in phase-shift keying transmission." Optics Letters, vol. 27, No. 18. Sep. 15, 2002: 1619-1621.*

(Continued)

Primary Examiner—Jason Chan
Assistant Examiner—David S. Kim

(57) ABSTRACT

A nonlinear phase-shift compensation method and apparatus is provided for improving system performance in optical transmission systems. The apparatus includes a phase-shift compensating device that provides a partial compensating phase shift to reduce the nonlinear phase noise resulting from self-phase modulation and amplified spontaneous emissions in an optical transmission system.

16 Claims, 5 Drawing Sheets

OTHER PUBLICATIONS

E. Iannone et al., "*Nonlinear Optical Communication Networks*", (Wiley, New York, 1998), Chapter 2, pp. 20-69.

L. F. Mollenauer et al., "Demonstration of Massive Wavelength-Division Multiplexing Over Transoceanic Distances By Use Of Dispersion-Managed Solitons", *Optics Letters*, vol. 25, No. 10, May 15, 2000, pp. 704-706.

T. Miyano et al., "Paper 14D3-3," Suppression of Degradation Induced by SPM/XPM+GVD in WDM Transmission Using a Bit-Synchronous Intensity Modulated DPSK Signal, *OECC 2000*, Jul. 2000, pp. 580-581.

J. Leibrich et al., "CF-RZ-DPSK For Suppression Of XPM On Dispersion-Managed Long-Haul Optical WDM Transmission On Standard Single-Mode Fiber", *IEEE Photonics Technology Letters*, vol. 14, No. 2, Feb. 2002, pp. 155-157.

J. P. Gordon et al., "Phase Noise In Photonic Communications Systems Using Linear Amplifiers", *Optics Letters*, vol. 15, No. 23, Dec. 1, 1990, pp., 1351-1353.

C. Pare et al., "Compensating For Dispersion And The Nonlinear Kerr Effect Without Phase Conjugation", *Optics Letters*, vol. 21, No. 7, Apr. 1, 1996, pp. 459-461.

W. A. Atia et al., "Demonstration of Return-to-Zero Signaling in Both OOK and DPSK Formats to Improve Receiver Sensitivity in an Optically Preamplified Receiver", *LEOS 1999*, Paper TuM3, pp. 226-227.

P. Vidakovic et al., "Large Nonlinear Phase Shift Owing to Cascaded $\chi^{(2)}$ in Quasi-Phase-Matched Bulk $LiNbO_3$", *Optics Letters*, vol. 22, No. 5, Mar. 1, 1997, pp. 277-279.

R. Schiek et al., Second-Harmonic Generation and Cascaded Nonlinearity in Titanium-Indiffused Lithium Niobate Channel Waveguides, *J. Opt. Soc. Am. B*, vol. 15, No. 8, Aug. 1998, pp. 2255-2268.

J. P. Gordon et al., "Randon Walk of Coherently Amplified Solitons in Optical Fiber Transmission", *Optics Letters*, vol. 11, No. 10, Oct. 1986, pp., 665-667.

W. Forysiak et al., "Reduction of Gordon-Haus Jitter By Post-Transmission Dispersion Compensation", *Electronics Letters*, vol. 29, No. 13, Jun. 24, 1993, pp. 1225-1226.

C. J. McKinstrie, "Gordon-Haus Timing Jitter in Dispersion Managed Soliton Systems With Distributed Amplification", *Optics Communications*, V200, 1-6, Dec. 15, 2001, pp. 165-177.

M. Hanna et al., "Soliton Optical Phase Contol By Use of In-Line Filters", *Optics Letters*, vol. 24, No. 11, Jun. 1, 1999, pp. 732-734.

\* cited by examiner

Electrical Power

NONLINEAR PHASE-SHIFT COMPENSATION METHOD AND APPARATUS

FIELD OF INVENTION

This invention relates generally to the field of optical telecommunications, and in particular, to a method and apparatus for improving optical transmission performance by reducing phase jitter in optical transmission systems using a nonlinear phase-shift compensator.

BACKGROUND OF THE INVENTION

Ultra-long-haul (ULH) optical transmission is of crucial importance to increase the flexibility of future optical networks. The transmission distance of ULH transmission is limited by amplified spontaneous emission (ASE) noise and fiber nonlinearities. The use of dispersion-managed solitons (DMS) and other signal formats in such systems has attracted attention because of the potential for increased transmission performance. DMS systems balance self-phase-modulation (SPM) with fiber dispersion, and avoid intra-channel cross-phase-modulation (XPM) and four-wave-mixing (FWM) by maintaining a moderate degree of pulse breathing. However, there exists a severe nonlinear penalty in DMS-based dense-wavelength-multiplexed (DWDM) transmissions, namely inter-channel XPM which introduces severe timing jitter.

Differential-phase-shift-keying (DPSK) and other phase-shift keying modulation formats such as quadrature phase-shift keying (DQPSK) have also attracted much attention because of their potential to significantly reduce the XPM penalty in DWDM systems. However, the performance of such systems is generally limited by the Gordon-Mollenauer effect, in which ASE power noise is converted into phase noise by self-phase modulation (SPM).

Nonlinearity management based on distributed nonlinearity compensation (nonlinearity compensated at several locations within a soliton period) has been proposed to improve transmission performance. A distributed nonlinear compensator is, however, extremely complicated, and therefore very expensive. An example of distributed nonlinearity compensation includes fibers with alternating positive and negative nonlinear refractive indices (n2). Such fibers can be used to effectively cancel the nonlinear phase shift resulting from SPM. However, such fiber does not exist at the communication wavelength window (~1.55 um). Accordingly, a need exists for a practical and cost effective method and apparatus for reducing the nonlinear phase noise resulting from SPM and ASE.

SUMMARY OF THE INVENTION

In accordance with one aspect of the invention, nonlinear phase shift compensation is provided for improving system performance of optical transmissions by reducing the nonlinear phase noise resulting from SPM and ASE. In one embodiment of the method and apparatus of the invention, nonlinear phase noise in PSK systems, induced by SPM, is reduced by adding a phase shift proportional to the pulse power of each optical pulse.

In a preferred embodiment of the invention, quadratic nonlinear materials are provided, such as periodically-poled LiNbO$_3$ (PPLN), to generate the nonlinear phase shifting needed in NPSC.

In another embodiment, a phase modulator is used to modulate the phase of the data pulses that are to be applied to a PSK receiver. The phase modulation is data driven such that the magnitude of the phase modulation introduced in the phase modulator is arranged to be proportional to the detected data pulse intensity, while the sign is arranged to be opposite to the nonlinear phase shift caused by SPM.

Significant performance improvement is achieved by such NPSC devices in single-channel and WDM transmission systems.

BRIEF DESCRIPTION OF THE DRAWINGS

The present invention will be more fully appreciated by consideration of the following detailed description, which should be read in light of the drawings in which.

DETAILED DESCRIPTION OF THE INVENTION

Figures 1, 2:
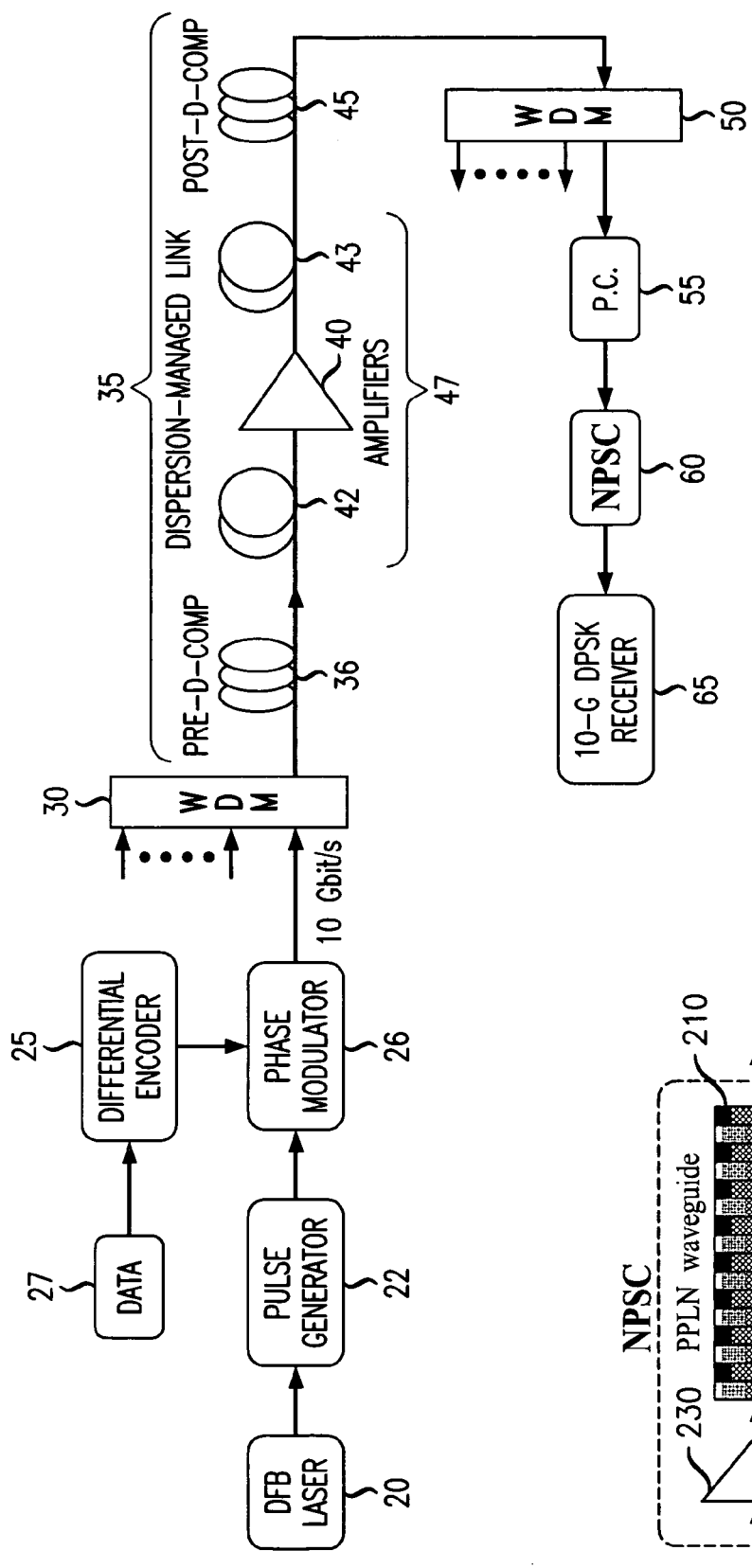
FIG. 1 is a schematic diagram of a DPSK system according to one embodiment of the invention.
FIG. 2 is a schematic diagram of one embodiment of an NPSC apparatus of the invention.

A schematic diagram of a DMS-DPSK system 10 according to one embodiment of the invention is shown in FIG. 1. On the transmitter side, a DBF laser 20 and a pulse generator 22 are used to generate a pulse train (e.g., with a repetition rate of 10 GHz and a duty cycle of 33% (pulse full width half maximum (FWHM) of 33 ps)). A 10 Gb/s differential data encoder 25 and a phase modulator 26 are provided to encode data from data source 27 in the phase of the optical pulses in such a way that every 0(1) in the original data is represented by a π(0) shift in the relative phase of two adjacent pulses. A multiplexer 30 is used to multiplex several WDM channels before being launched into a dispersion-managed link 35.

On the receiver side, the WDM channels are de-multiplexed using a demultiplexer 50. A polarization controller 55, which may comprise three waveplates, is preferably used to rotate the polarization of the signal wave such that the signal output polarization matches well with the desired direction of the NPSC device 60 to maximize the efficiency of negative nonlinear phase shift generation.

Each channel is then sent through an NPSC device 60 that provides a partial compensating nonlinear phase shift to reduce to nonlinear phase noise from SPM and ASE. The compensating phase shift is approximately proportional to the pulse power of the optical pulses transmitted by the system 10. The partial compensating phase shift is effectively provided over a central portion of the bit period of transmitted pulses (i.e. within the decision window of each bit slot) and compensates for only a portion of the magnitude of the phase shift resulting from SPM and ASE.

Specifically, the partial compensating phase shift does not provide a compensating phase shift (to eliminate nonlinear phase noise) for a transmitted pulse outside of the decision window of each bit slot (e.g. outside of the central 20% of the bit period). Further, the magnitude of the partial compensating phase shift is not equal to the magnitude of the phase shift resulting from SPM and ASE. The partial compensating phase shift is, however, sufficient to substantially eliminate nonlinear phase noise which results from SPM and ASE.

Each channel is then decoded at a DPSK receiver 65. The DPSK receiver 65 preferably comprises a differential phase decoder that includes an optical delay interferometer and a balanced detector (not shown).

Lumped NPSC can be performed either at the receiver 65, or at other locations along a dispersion managed link. Lumped NPSC provides significant Q factor improvement (e.g., greater than about 3 dB) in ultra-long-haul DMS-DPSK systems, even when many wavelength channels are closely multiplexed. For DWDM systems with bit rates of 10 Gb/s per channel a transmission distance of about 6,000 km or more can be achieved.

The following table shows the number of compensators (N), the respective approximate location for the compensators along the length (L) of the dispersion managed link 35, and the normalized phase shift factor, and the reduction in nonlinear phase noise variance for systems having 1 to N compensators.

| Number of compensators | Location(s) | Normalized phase shift factor | Reduction in nonlinear phase noise variance |
|---|---|---|---|
| 1 | L | −1/2 | 6 |
| 2 | L/2, L | −1/2, −1/4 | 12 |
| 3 | L/3, 2L/3, L | −1/3, −1/3, −1/6 | 15.6 |
| . | . | . | . |
| . | . | . | . |
| . | . | . | . |
| N | L/N, 2L/N, . . . (N − 1)L/N, L | −1/N, −1/N . . . 1/N, −1/2N | 20log(2N) |

The normalized phase shift factor is multiplied by the peak pulse phase shift, after transmission through the system, to determine an optimum phase shift for each transmitted pulse. It can be appreciated by those skilled in the art that the location(s) of the compensators can be varied by about 50%, and the normalized phase shift factor(s) can be varied by about 70% while still providing a significant improvement in transmission performance.

In a preferred embodiment, the NPSC device 60 is a periodically-poled waveguide 210. As shown in FIG. 2, the waveguide 210 is preferably a LiNbO$_3$ (PPLN) waveguide in which negative nonlinear phase shifts in excess of about 1 rad can be produced with realistic pump powers by a cascaded $\chi^{(2)}:\chi^{(2)}$ process.

A cascade quadratic process is basically a phase-mismatched second-harmonic generation process that effectively generates onto the incoming pulse a phase shift that is approximately proportional to the intensity of the pulse. The sign of the generated nonlinear phase shift is determined by the sign of the phase-mismatch that is related to the difference between the indexes of reflection of the signal wave and its second harmonic. The magnitude of the generated phase shift is approximately inversely proportional to the degree of the phase-mismatch and signal power, both of which can be controlled/varied to obtain an optimum nonlinear phase shift desired for the reduction of signal phase noise.

The phase-mismatch can be controlled by changing the temperature of the PPLN waveguide 210 using, for example, temperature controller 220. Assuming realistic PPLN waveguide parameters and a phase mismatch of ~4π, the effective nonlinear coefficient of the PPLN waveguide 210 is approximately 10$^4$ times that of silica fiber. The estimated power requirement for compensating the nonlinear phase shift associated with 6,000 km of DMS transmission is less than about 100 mW. The bandwidth of the NLPC device 60 is about 0.3 nm, which is adequate for applications in conventional 10-Gbit/s DMS systems. The temperature controller 220 is used to control the temperature of the PPLN waveguide 210 to the value that gives the appropriate sign of phase-mismatch, and thus the appropriate sign of nonlinear phase shift, and the appropriate magnitude of the phase shift. An optical amplifier 230 is preferably used to boost the power of the received signal so that the nonlinear phase shift generated by PPLN waveguide 210 is substantially an optimum value for reducing the phase noise. As discussed above with reference to the table, the location(s) of the compensator(s) can be varied by about 50%, and the normalized phase shift factor(s) can be varied by about 70% while still providing a significant improvement in transmission performance.

Numerical simulations were performed to verify the effectiveness of NPSC. DMS-DPSK transmission was modeled with five 10-Gbit/s WDM channels, each of which is modulated by a 2$^7$−1 pseudo-random binary sequence, sufficient to take into consideration the intra-channel pattern dependence with the dispersion map used in the simulation. Normally, in DMS systems, only the adjacent bits interact with each other, and the interaction is very weak since solitons maintain well-defined temporal profiles during propagation in fiber links, therefore 2$^7$−1 pseudo-random binary sequence is sufficient to take into consideration the intra-channel pattern dependence.

As shown in FIG. 1, the dispersion-managed link 35 of the DPSK system 10 comprises a pre-dispersion fiber 36, one or more dispersion managed spans 47, each followed by a post-dispersion fiber 45. Each dispersion managed span 47 comprises a 100-km fiber span 42, (D=6 ps/km/nm), an amplifier 40 and a dispersion-compensating fiber 43 (DCF).

The pre-dispersion is −300 ps/nm and the post-dispersion is fixed at 150 ps/nm. The dispersion of each fiber span 42 is partially compensated by the DCF 43. The residual dispersion per dispersion managed span 47 is about 10 ps/nm. The nonlinear coefficient is 1.8 W/km. Fiber loss is about 23 dB per 100-km fiber span 42, and is compensated by backward Raman amplification. The path-average signal power is about −8 dBm per channel and the ASE noise level is about −36 dB per fiber span 42 (the ASE noise is defined as the added noise power in a bandwidth of 0.1 nm, measured relative to the signal power).

Figure 3A:
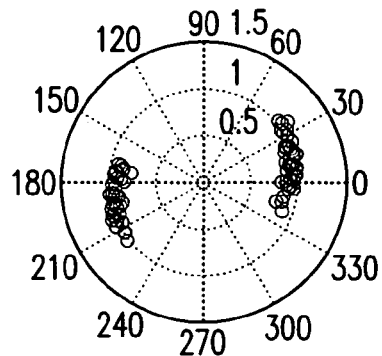
FIGS. 3a–c are phasor diagrams of the optical field for single-channel, 100 GHz spaced WDM, and 50 GHz spaced WDM transmissions in a DMS-DPSK system, without NPSC, respectively.
Figure 3B:
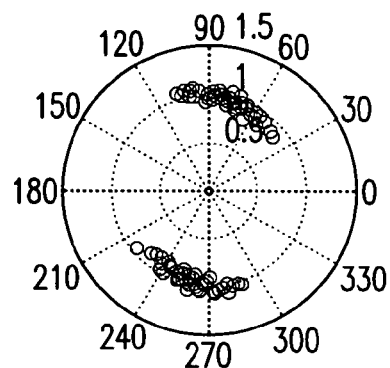
Figure 3C:
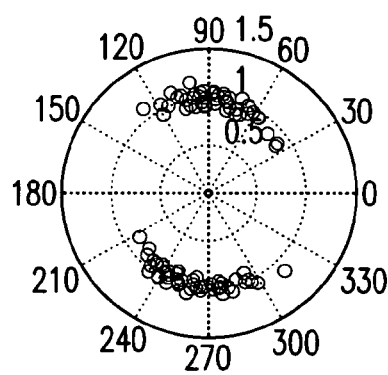
Figure 3D:
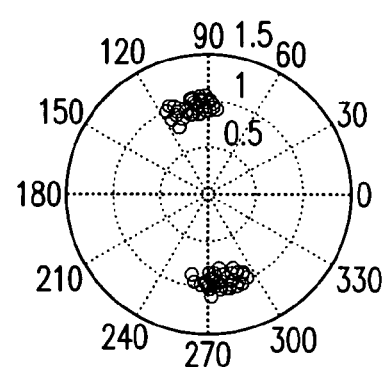
FIGS. 3d–f are phasor diagrams of the optical field for single-channel, 100 GHz spaced WDM, and 50 GHz spaced WDM transmissions in a DMS-DPSK system, with NPSC, respectively.
Figure 3E:
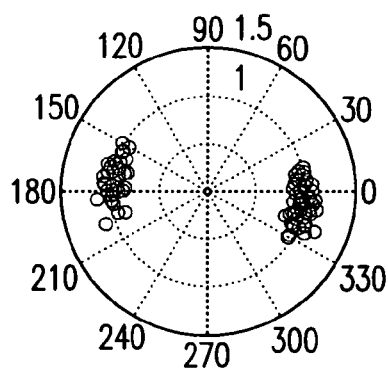
Figure 3F:
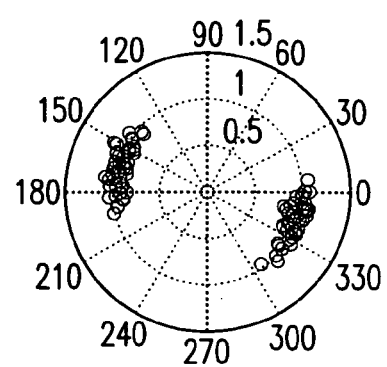

FIGS. 3a–f show the phasor diagrams of the centers of output pulses after 6,000 km of transmission in 10-Gbit/s modeled DMS-DPSK systems. The phasor diagrams show the electrical fields of the bits in a polar coordinate to clearly illustrate the variance due to amplitude jitter and phase jitter. FIGS. 3a and 3d pertain to a single-channel system, without and with NPSC, respectively. The mean phase shift from SPM (observed in a noiseless simulation) is ~3.1 rad. There is also a phase shift of ~0.3 rad from XPM between ASE noise (in the entire simulation window) and the signal.

The mean compensating phase shifts was set to be −1.4 rad. The total phase variance was reduced by 5.2 dB. FIGS. 3b and c, and 3e and f pertain to a WDM system with a channel spacing of 100 and 50 GHz, without (b and c) and with (e and f) NPSC, respectively. The mean compensating phase shifts are the same as those used in FIG. 3d. The mean signal phase shift is ~1.2 rad larger in both five-channel cases than in the single-channel case, owing to inter-channel XPM. Even when the channel spacing is reduced to 50-GHz, the proposed NPSC scheme is still very effective. The Q-factor can be improved by approximately 4 dB or more through NPSC. The slight reduction of effectiveness when channel spacing is reduced is due to the fact that the nonlinear phase noise resulting from XPM and ASE induced amplitude fluctuations, which can not be reduced by NPSC, is enhanced with the reduction of channel spacing.

Figure 4:
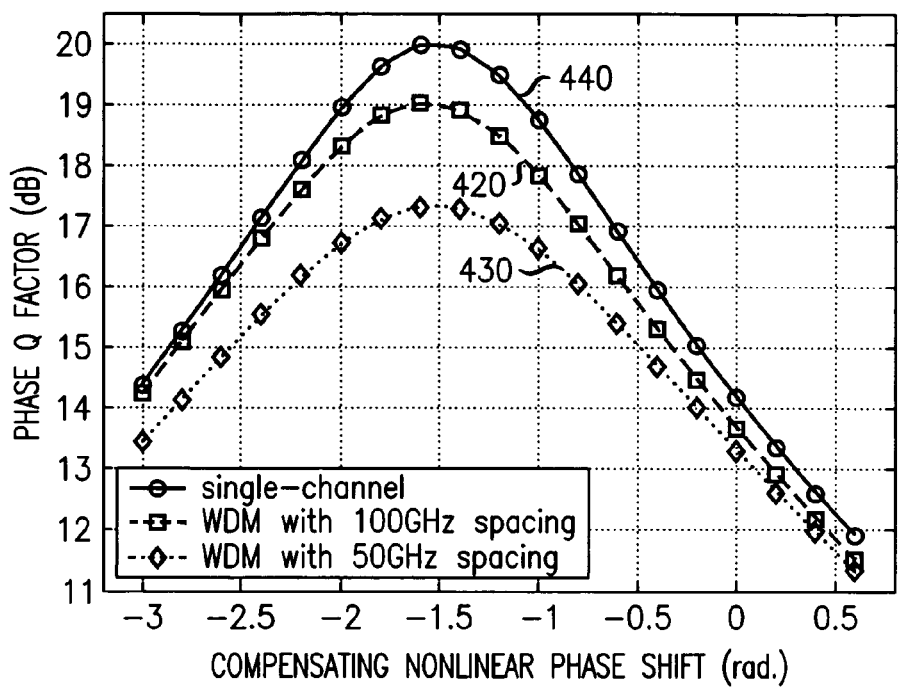
FIG. 4 is a diagram illustrating the dependence of differential phase Q factor on the amount of compensating nonlinear phase shift in single-channel system (circles) and DWDM systems with 100-GHz (squares) and 50-GHz (diamonds) channels spacings.

To find the substantially maximal performance improvement obtained by NPSC and to find the optimal compensating phase shift, the differential phase Q factors (defined as $\pi$ divided by the sum of the RMS variations of differential phases between two adjacent bits around 1s and 0s) were calculated for several values of the compensating phase shift. The data (128 bits per channel) was propagated through the same link 64 times with different ASE noises and the phase noise variance was calculated after each transmission with different compensating nonlinear phase shifts. FIG. 4 shows the dependence of $Q^2$ (in dB) on the compensating phase shift in a single-channel system 410 and WDM systems with 100-GHz 420 and 50-GHz 430 channel spacings. In all three cases, a substantially optimal compensating phase shift is approximately −1.5 rad., which is close to one-half of the accumulated nonlinear phase shift. Under substantially optimal NPSC, the phase noise variance, which is inversely proportional to $Q^2$, is reduced by 5.2 dB, 4.8 dB, and 3.6 dB in the three transmission configurations, respectively.

Phase jitter was also simulated in single-channel and WDM systems with NPSC at the middle and end points of the system. As discussed above and shown in the above table, the combination of interior and end point NPSC devices produced a larger reduction in phase jitter than an end point NPSC device alone.

Figure 5:
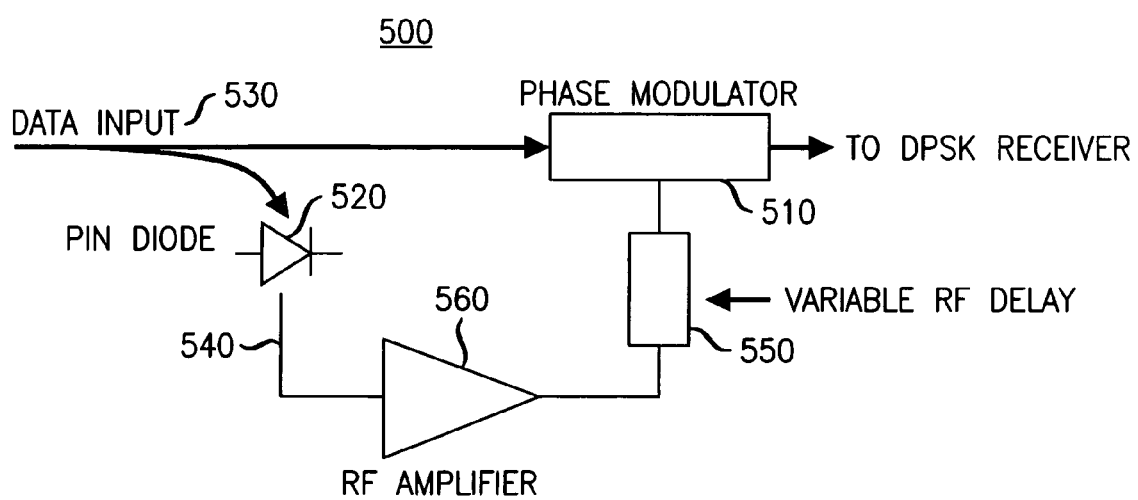
FIG. 5 is a schematic drawing of another embodiment of an NPSC apparatus according to the invention for a DPSK system with post-nonlinearity compensation based on data-driven phase modulation.

In another preferred embodiment of an NPSC device 500 according to the invention, as shown in FIG. 5, an optical phase modulator 510 is provided, which is used to modulate the phase of the data pulses in front of a receiver (not shown). The nonlinear phase noise is preferably compensated within the decision window of each bit slot (e.g., the central 20% of the bit period), to make NPSC much more practical. The magnitude of the phase modulation is preferably directly proportional to the detected pulse intensity, and the sign is opposite to the nonlinear phase shift caused by SPM. Thus, the nonlinear phase noise induced by amplitude fluctuation and SPM in the central window of each bit period is substantially compensated.

To obtain a substantially optimum transmission performance, the magnitude and sign of the phase modulation (i.e. the normalized phase shift factor) is preferably provided as discussed above with reference to the table. As also discussed above, the location(s) of the compensator(s) can be varied by about 50%, and the normalized phase shift factor(s) can be varied by about 70% while still providing a significant improvement in transmission performance.

To avoid potential bandwidth limitations and peak power requirements of nonlinear crystals, the embodiment shown in FIG. 5 uses a data-driven phase modulator 510 to generate, in effect, negative nonlinear phase shift. As shown in FIG. 5, a PIN-diode 520 may be used to detect the incoming data stream 530. The PIN-diode 520 preferably has an FWHM electrical bandwidth of about 10 GHz. The output of the PIN-diode 540 is used to drive the phase modulator 510 with an electrical bandwidth of about 10 GHz. A variable RF delay line 550 is preferably used so that the optical and electrical signals of the same data pulse arrive simultaneously at the phase modulator 510. Preferably, the sign of the drive voltage is such that the phase modulation generated by the phase modulator 510 is the opposite of that generated by SPM.

Polarization diversity schemes, including the use of a plurality of phase modulators 510, may also be incorporated if the phase modulator(s) 510 are polarization sensitive. An RF amplifier 560 is preferably used to boost the amplitude of the RF signal so that the resulting phase shift is close an optimum value for NPSC.

It can be understood by a person skilled in the art that a plurality of NPSC devices 60 according to the invention may be employed in a WDM optical transmission system over multiple dispersion managed spans 47 to reduce phase jitter on a plurality of channels of a WDM system.

Figure 6A:
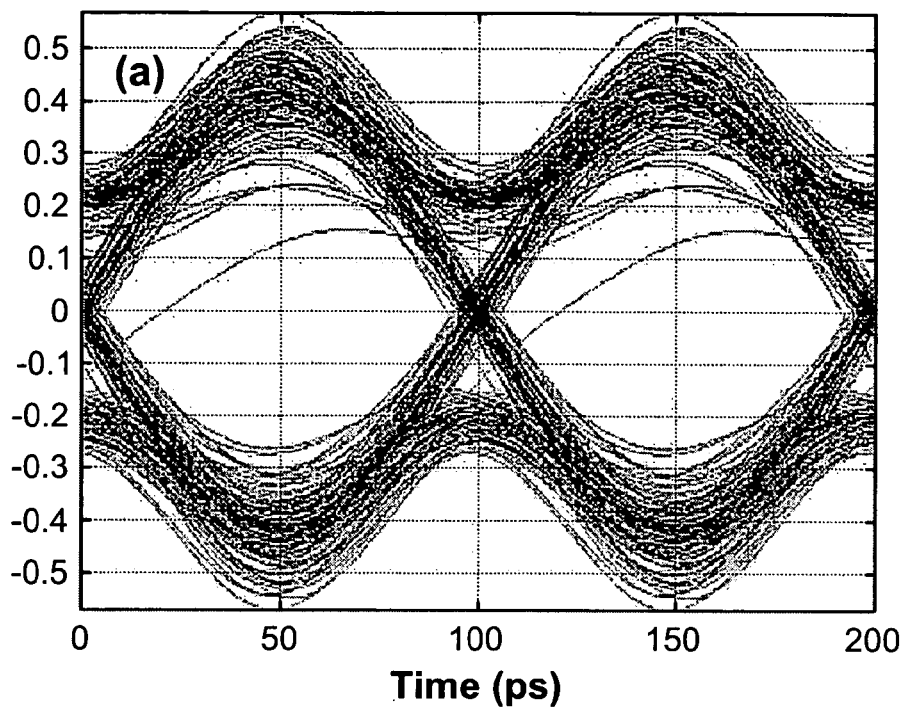
FIGS. 6a–b are eye-diagrams after transmission over a distance of 6000 km without and with data-driven phase modulation based post NPSC, respectively.
Figure 6B:
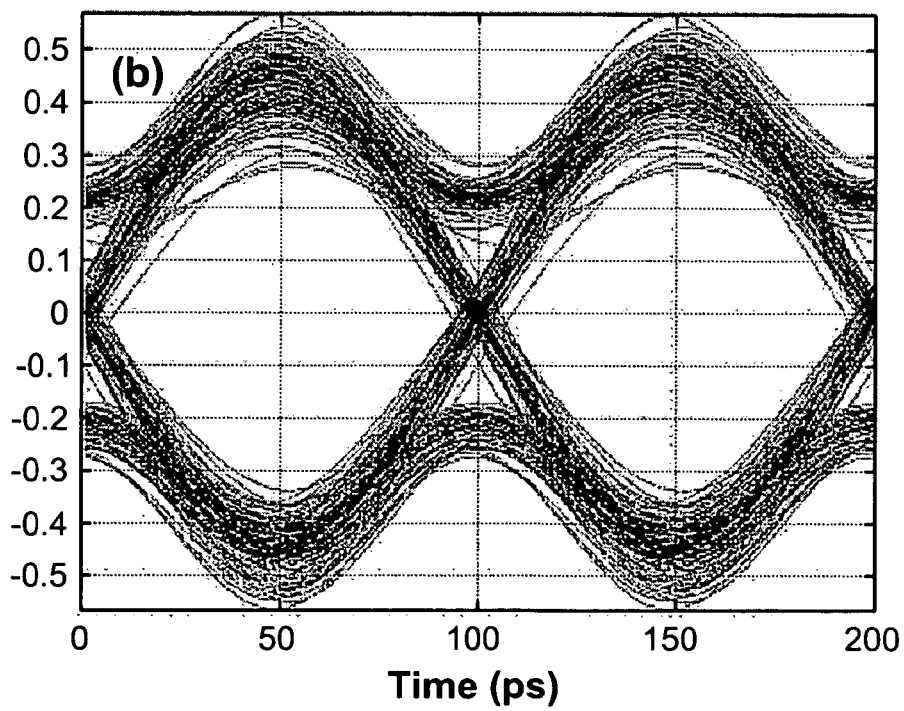

The transmitted eye-diagram for a system employing an NPSC device as shown in FIG. 1 is shown in FIG. 6. Eye-diagrams provide a good picture of how well a certain transmission system is performing. The wider the eye-opening, the better the performance of the received signal. It is evident from FIG. 6 that, with NPSC (FIG. 6b), the eye-opening is much wider than without NPSC (FIG. 6a).

Figure 7:
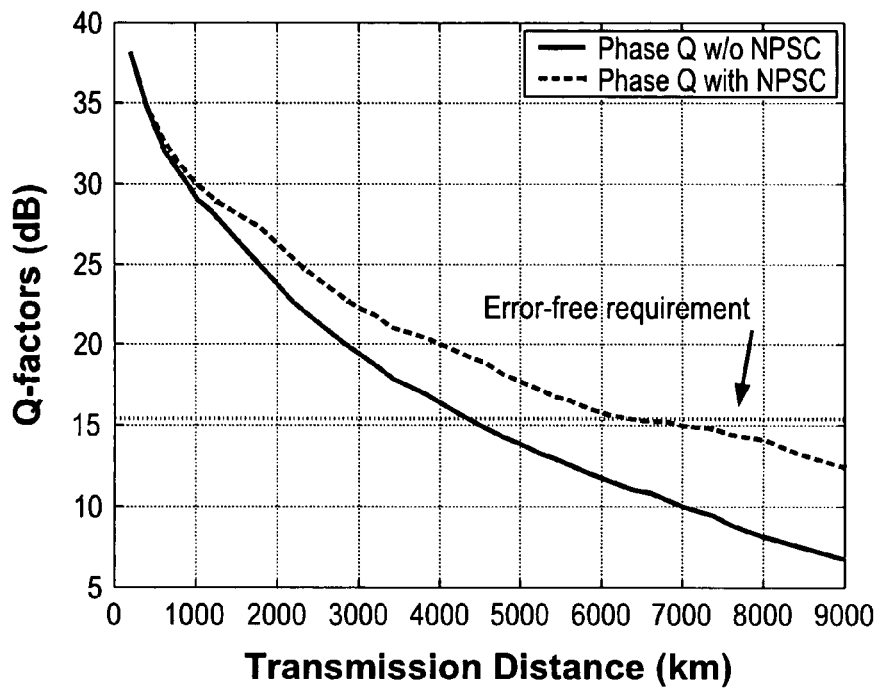
FIG. 7 shows plots of Q-factors vs. transmission distance for a WDM system with and without NPSC.

The system Q factor as a function of transmission distance is shown in FIG. 7. Q-factor is directly related the bit-error-rate of received signals. At a Q-factor value of 15.5 dB, the corresponding bite-error-rate is $\sim 10^{-9}$, which is commonly referred to as the error-free requirement. As can be seen from FIGS. 6 and 7, reducing phase jitter by NPSC significantly improves the performance of a DMS-DPSK system.

Figure 8:
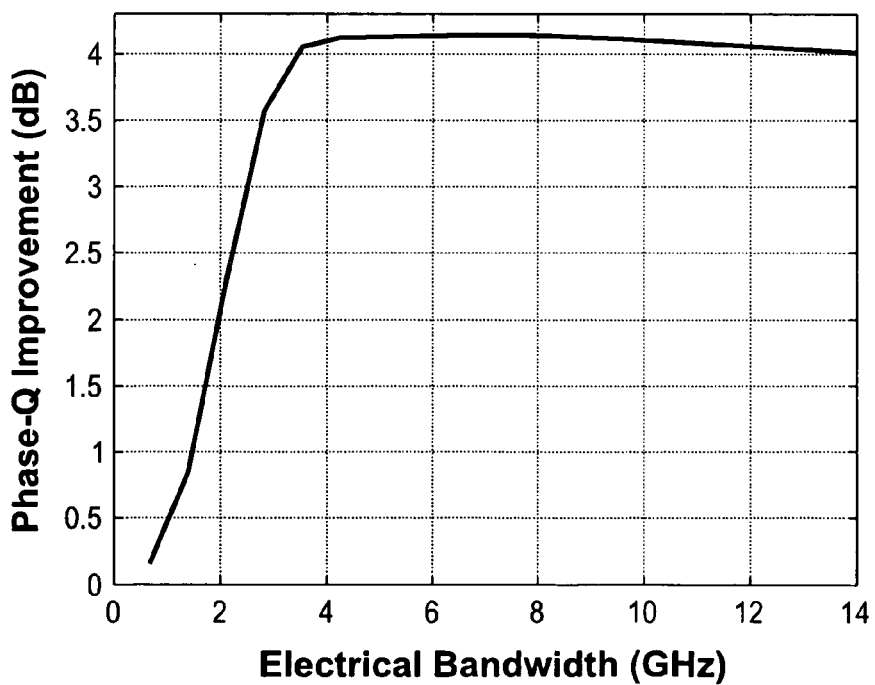
FIG. 8 is a plot showing the improvement of phase-Q at a transmission distance of 6000 km as a function of the effective electrical bandwidth.

As can be seen from FIG. 8, NPSC devices with ultra-fast response are not necessary in nonlinearity management. The effective electrical bandwidth of the phase modulation of the present invention, (i.e., the electrical bandwidth of the PIN-diode 520, the RF amplifier 560, and the phase modulator 510 combined), is preferably greater than about 4 GHz (or about 40% of the line rate) in order to obtain the full benefit of NPSC. Therefore, the bandwidth of line rate components is more than sufficient for NPSC. In addition, the optimum value for the NPSC is approximately half the total accumulated nonlinear phase shift, which is typically much less than $\pi$ in an ULH DWDM system. Thus, the method of the present invention can be readily implemented in 40 Gb/s DPSK systems and beyond.

Phase modulators 510, such as Lithium Niobate modulators, are also applicable in broad wavelength range, which makes embodiments of the present invention very attractive in broadband DWDM transmission systems.

It will be appreciated by those skilled in the art that various changes can be made to the embodiments described above without departing from the broad inventive concept thereof. It is understood, therefore, that this invention is not limited to the particular embodiments disclosed, but is intended to cover modifications within the spirit and scope of the appended claims and their legal equivalents. For example, although some of the embodiments disclosed herein have been described with reference to DMS-DPSK signal/modulation formats, other signal formats, such as NRZ and RZ, and other modulation formats, such as ASK, PSK, DPSK and DQPSK, may be employed with the apparatus and method of the invention.

The invention claimed is:

1. A phase-shift compensator apparatus comprising:
two or more phase-shift compensating devices,
wherein the two or more phase-shift compensating devices are provided along the length L of a transmission system and provide a compensating phase shift according to the following table

| Compensators | Location | Normalized Phase Shift Factor |
|---|---|---|
| 1 | L | −1/2 |
| 2 | L/2, L | −1/2, −1/4 |
| 3 | L/3, 2L/3, L | −1/3, −1/3, −1/6 |
| . | . | . |
| . | . | . |
| . | . | . |
| N | L/N, 2L/N, . . . (N − 1)L/N, L | −1/N, −1/N, . . . −1/N, −1/2N | wherein the normalized phase shift factor is multiplied by the peak pulse phase shift after transmission through the transmission system to determine an optimum compensating phase shift.

2. The apparatus of claim 1 wherein the location of the compensators can be varied by about 50% while providing a compensating phase shift and improved transmission performance.

3. The apparatus of claim 1 wherein the normalized phase shift factor can be varied by about 70% while providing a compensating phase shift and improved transmission performance.

4. The apparatus of claim 1, wherein the two or more phase-shift compensating devices include quadratic nonlinear material with an effective nonlinear index of refraction $n_2 < 0$ from the cascaded $\chi^{(2)}{:}\chi^{(2)}$ effect.

5. The apparatus of claim 4, wherein the quadratic nonlinear material includes periodically-poled $LiNbO_3$.

6. The apparatus of claim 1, wherein the one or more phase-shift compensating devices include a phase modulator.

7. The apparatus of claim 6, further comprising drive means for driving the phase modulator such that the magnitude of the phase modulation is proportional to input data pulse intensity, and the sign of the phase shift is opposite to the phase shift caused by self-phase modulation.

8. The apparatus of claim 7, wherein the drive means includes:
a PIN diode;
an RF amplifier; and
a variable RF delay.

9. A method for nonlinear phase shift compensation comprising:
providing two or more phase-shift compensating devices along a length L of an optical transmission system to provide a compensating phase shift to input data pulses according to the following table

| Compensators | Location | Normalized Phase Shift Factor |
|---|---|---|
| 1 | L | −1/2 |
| 2 | L/2, L | −1/2, −1/4 |
| 3 | L/3, 2L/3, L | −1/3, −1/3, −1/6 |
| . | . | . |
| . | . | . |
| . | . | . |
| N | L/N, 2L/N, . . . (N − 1)L/N, L | −1/N, −1/N, . . . −1/N, −1/2N | wherein the normalized phase shift factor is multiplied by the peak pulse phase shift after transmission through the transmission system to determine an optimum compensating phase shift.

10. The apparatus of claim 9 wherein the location of the compensators can be varied by about 50% while providing a compensating phase shift and improved transmission performance.

11. The apparatus of claim 9 wherein the normalized phase shift factor can be varied by about 70% while providing a compensating phase shift and improved transmission performance.

12. The method of claim 9, wherein the two or more phase-shift compensating devices include quadratic nonlinear material with an effective nonlinear index of refraction $n_2 < 0$ from the cascaded $\chi^{(2)}{:}\chi^{(2)}$ effect.

13. The method of claim 9, wherein one or more phase-shift compensating devices comprises a phase modulator, and wherein the method further comprises:
driving the phase modulator in synchronism with the input data pulses such that the magnitude of the phase modulation is proportional to input data pulse intensity, and the sign of the phase shift is opposite to the phase shift caused by self-phase modulation.

14. A phase-shift compensator apparatus comprising:
two or more phase-shift compensating means,
wherein the two or more phase-shift compensating means are provided along the length L of a transmission system and provide a compensating phase shift according to the following table

| Compensators | Location | Normalized Phase Shift Factor |
|---|---|---|
| 1 | L | −1/2 |
| 2 | L/2, L | −1/2, −1/4 |
| 3 | L/3, 2L/3, L | −1/3, −1/3, −1/6 |
| . | . | . |
| . | . | . |
| . | . | . |
| N | L/N, 2L/N, . . . (N − 1)L/N, L | −1/N, −1/N, . . . −1/N, −1/2N. |

15. The apparatus of claim 14 wherein the location of the compensators can be varied by about 50% while providing a compensating phase shift and improved transmission performance.

16. The apparatus of claim 14 wherein the normalized phase shift factor can be varied by about 70% while providing a compensating phase shift and improved transmission performance.

* * * * *